S. TRUSCOTT.
BALLONNET GAGE.
APPLICATION FILED MAY 8, 1919.

1,345,417. Patented July 6, 1920.

Inventor
Starr Truscott

By Monroe F. Miller
Attorney

UNITED STATES PATENT OFFICE.

STARR TRUSCOTT, OF BIRMINGHAM, OHIO.

BALLONNET-GAGE.

1,345,417.

Specification of Letters Patent.   Patented July 6, 1920.

Application filed May 8, 1919.  Serial No. 295,739.

*To all whom it may concern:*

Be it known that I, STARR TRUSCOTT, a citizen of the United States, and resident of Birmingham, in the county of Erie and State of Ohio, have invented new and useful Improvements in Ballonnet - Gages, of which the following is a specification.

The present invention relates to a device for indicating to the pilot of a balloon, the amount of air in the ballonnet or ballonnets, in order that calculations can be made to determine the volume of gas in the balloon, and it is the object of the invention to provide a novel contrivance of that character which is comparatively simple in construction, and practical in operation.

A further object is the provision of such a device including means operated by the inflation and deflation of the ballonnet and transmitting the changes in the condition of the ballonnet, through suitable means, to an indicator or gage under the observation of the pilot, in order that the condition of the ballonnet will be accurately indicated or determinable.

With the foregoing and other objects in view which will be apparent as the description proceeds, the invention resides in the construction and arrangement of parts hereinafter described, it being understood that changes can be made within the scope of what is claimed without departing from the spirit of the invention.

The invention is illustrated in the accompanying drawing, wherein:—

Fig. 3 is an elevation of the gage or indicator proper and the devices for making adjustments due to temperature changes and the like.

Figure 1:
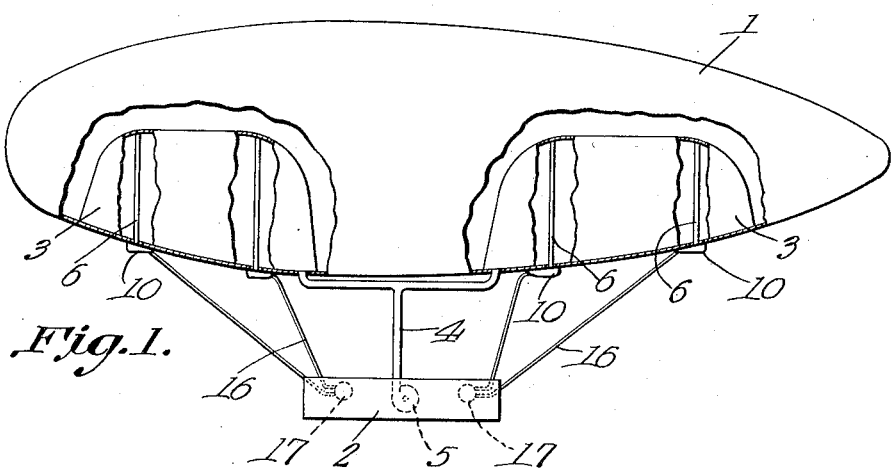
Figure 1 is a diagrammatical side elevation of a balloon showing the apparatus installed, the balloon and ballonnet being shown in side elevation with portions broken away.
Figure 2:
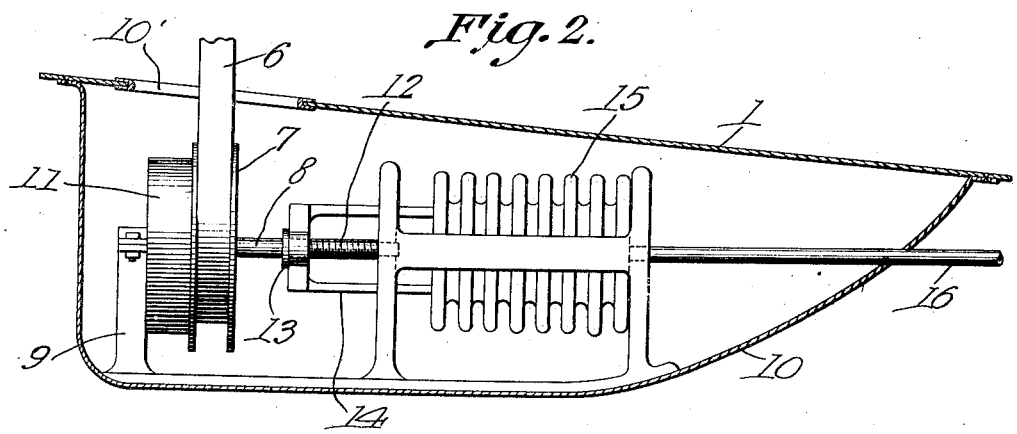
Fig. 2 is an enlarged elevation of the mechanism operated by the movement of the ballonnet for transmitting the changes to the indicator or gage.

The present appliance can be installed in various balloons, and the dirigible balloon 1 shown has the usual basket or car 2 suspended therefrom, and is provided on the interior above the bottom with the ballonnets 3. Although two ballonnets are shown, there may be only one or three or more, according to the size of the balloon. These ballonnets 3, as is well known, are inflated through a pipe or conduit 4 leading from a pump 5 or other means for supplying air under pressure, to the ballonnet, in order that the ballonnets will be kept inflated as the gas in the balloon contracts or is lost. In other words, the ballonnets are inflated to compensate for a reduction in the amount of gas, or in the volume thereof due to contraction, and when the gas expands, the ballonnets are deflated accordingly, so that the balloon 1 is kept properly inflated under all conditions. The present appliance is provided in order to indicate to the pilot located in the car 2, the volume or amount of air in the ballonnets, in order that they may know the amount of gas remaining in the balloon. It is frequently important to know, when making a flight by balloon, the amount of gas in the bag, because if too much gas has been lost, and the ballonnets are completely inflated, it is dangerous to lose more gas, and ordinarily, the pilot has no way of determining when this condition is reached.

In carrying out the invention, tapes 6 or similar flexible elements are used, being attached at their upper ends to the upper portions of the ballonnets 3, so that said tapes are raised when the ballonnets are inflated. As shown, there is a pair of tapes 6 for each ballonnet, near the opposite ends thereof, although in some cases, a single tape at the center of the ballonnet will be sufficient, but by using two or more tapes, especially for larger ballonnets, an average can be obtained for more accurate measurements. The lower end of each tape 6 is wound upon a drum 7 secured on a shaft 8 mounted within a suitable frame 9 suspended within a pocket 10 that is sewed or otherwise fastened to the bottom of the balloon 1 and suspended therefrom under an opening 10' through which the tape 6 extends. This opening 10' can be grometed or otherwise reinforced around its edge, and the pocket 10 will close the opening 10' to prevent the escape of air. A spring 11 between the shaft 8 and frame 9 tends to rotate the shaft and drum so as to wind the tape 6 thereon when the ballonnet is deflated, and as the ballonnet is inflated, the tape 6 is raised and unwound from the drum 7, thereby rotating the shaft 8 against the tension of the spring 11. In this way, the inflation and deflation of the ballonnet is transmitted to the shaft 8 which will rotate accordingly, and from the shaft 8, the motion is transmitted to a gage or indicator, as will presently appear.

In order to transmit the motion from the shaft 8, said shaft is screw threaded, as at 12, for operating a nut 13 carried by a yoke 14 connected to one end of an extensible chamber 15 having accordion sides. The other end of the chamber 15 is secured to the frame 9, so that the movement of the nut 13 will compress or expand the chamber 15. The chamber 15 is filled with oil or other suitable fluid that extends within a tube 16 connected to and leading from the chamber 15 down to a pressure gage or indicator 17 in the car 2. This gage 17 is of ordinary construction, operated by the pressure of the fluid in the tube 16, so that when the chamber 15 is contracted, the pressure will rise accordingly and move the arrow 18 away from zero, and when the chamber 15 expands, this will reduce the pressure accordingly. Therefore, as the ballonnet 3 rises and falls, due to the inflation and deflation thereof, the shaft 8 is rotated accordingly by the movement of the tape 6, thereby moving the nut 15 and yoke 15 longitudinally. The chamber 15 is thus contracted and expanded according to the movement of the ballonnet, and the fluid transmits the motion to the gage 17 in proper proportion, so that the arrow will indicate on a suitable scale of graduations, the amount of air in the ballonnet, either as a fraction of its whole capacity, or as a certain amount in cubic feet or other units.

Figure 3:
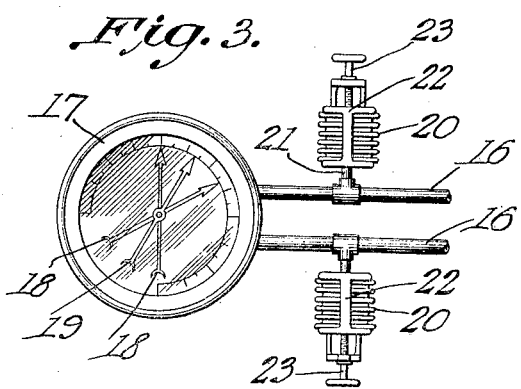

When using two or more tapes 6 in a ballonnet, the tubes 16 of the plurality of devices can be connected to a duplex gage 17, as seen in Fig. 3, with individual arrows or pointers 18 for the several tubes 16. An additional pointer 19 can be used for obtaining an average, in order that more accurate measurements can be obtained with large ballonnets, than with a single tape 6. In the device as shown, this pointer 19 is set by hand midway between the pointers 18 to obtain the average reading.

As a means for making adjustments due to temperature changes, expansion and contraction chambers 20 are provided for the tubes 16, preferably near the gage 17, said chambers 20 being connected to branches 21 of said tubes, and adjusting screws 23 are carried by yokes 22 for expanding and contracting said chambers similar to the chambers 15 above described. Thus, when the temperature increases so as to expand the fluid, this would raise the pressure, and consequently throw the pointer backwardly, and on the other hand, should the temperature decrease, this will cause the fluid to contract, and decrease the pressure so as to advance the pointer of the gage. By adjusting the respective chamber 20 through the medium of the screw 23, the fluid will be taken into or discharged from the chamber 20 to compensate for the change in temperature, and therefore bring the pointer of the gage to the proper graduation or zero when the ballonnet is deflated entirely.

Having thus described the invention, what is claimed as new is:—

1. The combination with a balloon having a ballonnet therein, an indicator for indicating the inflated condition of the ballonnet, and means movable with the ballonnet and operatively connected with the indicator for operating the indicator according to the movements of the ballonnet.

2. The combination with a balloon having a ballonnet therein, an indicator, means movable with the ballonnet, and means for transmitting the motion of said means to the indicator.

3. The combination with a balloon having a ballonnet therein, a pressure indicator, a tube extending from said indicator to a point near the ballonnet, and means operated by the ballonnet and connected to said tube for varying the pressure therein.

4. The combination with a balloon having a ballonnet, of a pressure indicator, an adjustable fluid chamber, means operated by the ballonnet for expanding and contracting said chamber proportional to the inflation and deflation of the ballonnet, and a tube connecting said chamber and indicator for transmitting the pressure to the indicator.

5. The combination with a balloon having a ballonnet therein, of a pressure indicator, an adjustable fluid chamber, a tube connecting said chamber and indicator for transmitting the pressure, a drum operatively connected to said chamber for contracting and expanding it, a tape wound on the drum and connected to the ballonnet to unwind the tape from the drum when the ballonnet is inflated, and means for winding the tape on the drum when the ballonnet is deflated.

6. A balloon having a ballonnet therein and an opening leading to the ballonnet, a pocket attached to the balloon across said opening, an indicator, and means operable within said pocket connected to the indicator and extending through said opening and connected to the ballonnet to be operated thereby.

7. A balloon having a ballonnet therein and an opening leading through said ballonnet, a pocket attached to the balloon across said opening, a tape extending through said opening and connected to the ballonnet, means within said pocket for winding up the tape and to be operated thereby when the ballonnet is inflated, an indicator, and an operative conection between said indicator and means within the pocket.

8. A balloon having a ballonnet therein and an opening leading to the ballonnet, a pocket attached to the balloon across said opening, a frame suspended within the pocket, a drum carried by said frame, a tape extending through said opening, attached to the ballonnet and wound on said drum, means for winding the tape on the drum when the ballonnet is deflated, an indicator, and means within the pocket operated by said drum and operatively connected to said indicator.

9. The combination with a balloon having a ballonnet therein, of a multiple indicator, and a plurality of means operated by said ballonnet when inflated and deflated and connected to said indicator for obtaining a plurality of indications for the purpose of obtaining an average reading.

10. The combination with a balloon having a ballonnet therein, of an indicator having a plurality of pointers, tapes connected to the ballonnet at different points, means for winding up each tape when the ballonnet is deflated and to be operated by the tape when the ballonnet is inflated, operative connections between said means and the indicator to individually move the pointers according to the movement of the respective tapes, and another pointer carried by the indicator to obtain an average reading.

In testimony whereof I hereunto set my hand.

STARR TRUSCOTT.